US011777982B1

(12) United States Patent
Zhu et al.

(10) Patent No.: US 11,777,982 B1
(45) Date of Patent: Oct. 3, 2023

(54) MULTIDIMENSIONAL SECURITY SITUATION REAL-TIME REPRESENTATION METHOD AND SYSTEM AND APPLICABLE TO NETWORK SECURITY

(71) Applicants: State Grid Zhejiang Electric Power Company Hangzhou Power Supply Company, Zhejiang (CN); State Grid Zhejiang Hangzhou Xiaoshan District Power Supply Company, Zhejiang (CN)

(72) Inventors: Jiong Zhu, Zhejiang (CN); Quanming Yue, Zhejiang (CN); Libo Fan, Zhejiang (CN); Ang Li, Zhejiang (CN); Rongjie Han, Zhejiang (CN); Jin Qian, Zhejiang (CN); Xiaohua Xu, Zhejiang (CN); Zhiqing Sun, Zhejiang (CN); Weihong Hou, Zhejiang (CN); Mengjun Du, Zhejiang (CN); Yibo Lai, Zhejiang (CN); Xue Feng, Zhejiang (CN); Yuanzhong Chen, Zhejiang (CN); Xinyue Zhou, Zhejiang (CN)

(73) Assignees: State Grid Zhejiang Electric Power Company Hangzhou Power Supply Company, Zhejiang (CN); State Grid Zhejiang Hangzhou Xiaoshan District Power Supply Company, Zhejiang (CN)

( * ) Notice: Subject to any disclaimer, the term of this patent is extended or adjusted under 35 U.S.C. 154(b) by 0 days.

(21) Appl. No.: 18/104,431

(22) Filed: Feb. 1, 2023

(30) Foreign Application Priority Data

Apr. 21, 2022 (CN) .................. 202210422964.X

(51) Int. Cl.
*H04L 9/40* (2022.01)
*H04L 43/045* (2022.01)

(52) U.S. Cl.
CPC ........ *H04L 63/1433* (2013.01); *H04L 43/045* (2013.01); *H04L 63/1425* (2013.01)

(58) Field of Classification Search
CPC .............. H04L 63/1433; H04L 43/045; H04L 63/1425; H04L 63/1416; H04L 63/1408; G06F 21/554
See application file for complete search history.

(56) References Cited

U.S. PATENT DOCUMENTS 10,462,170 B1 10/2019 Wang et al.
10,542,021 B1 * 1/2020 Mehr .................. H04L 63/1416
(Continued)

FOREIGN PATENT DOCUMENTS

CN 102231686 A 11/2011
CN 107835982 A 3/2018
(Continued)

OTHER PUBLICATIONS

Afshinpour et al., "Correlating Test Events With Monitoring Logs For Test Log Reduction And Anomaly Prediction," 2022 IEEE International Symposium on Software Reliability Engineering Workshops (ISSREW) Year: 2022 | Conference Paper | Publisher: IEEE.*
(Continued)

*Primary Examiner* — Roderick Tolentino
(74) *Attorney, Agent, or Firm* — The PL Law Group, PLLC

(57) ABSTRACT

A multidimensional security situation real-time presentation method according to an embodiment includes selecting security testing cases of at least one dimensionality based on a test instruction to generate a target test set, and generating a corresponding target log set according to the target test set,
(Continued)

determining a difference log set according to the target log set and a monitoring log set, and performing real-time output display of difference log events, test processing time periods, enhanced training nodes and a test processing efficiency corresponding to the difference log set.

6 Claims, 3 Drawing Sheets

(56) References Cited

U.S. PATENT DOCUMENTS

| | | | |
|---|---|---|---|
| 10,701,096 B1* | 6/2020 | Johnston | G06Q 10/20 |
| 11,650,892 B1* | 5/2023 | Joyner | H04L 43/50 |
| | | | 714/25 |
| 2020/0210592 A1* | 7/2020 | Karas | G06F 21/552 |
| 2020/0311260 A1* | 10/2020 | Klonowski | G06F 21/552 |
| 2020/0311261 A1* | 10/2020 | Klonowski | G06F 21/566 |
| 2021/0194773 A1* | 6/2021 | Gupta | H04L 41/0893 |
| 2022/0014560 A1* | 1/2022 | Crabtree | H04L 63/1433 |
| 2022/0191227 A1* | 6/2022 | Pfleger de Aguiar | H04L 63/1408 |
| 2022/0247772 A1* | 8/2022 | Ishida | H04L 12/66 |

FOREIGN PATENT DOCUMENTS

| | | |
|---|---|---|
| CN | 113487010 A | 10/2021 |
| WO | WO 2019/060327 A1 | 3/2019 |

OTHER PUBLICATIONS

Mantayla et al., "Pinpointing Anomaly Events in Logs from Stability Testing—N-Grams vs. Deep-Learning," 2022 IEEE International Conference on Software Testing, Verification and Validation Workshops (ICSTW) Year: 2022 | Conference Paper | Publisher: IEEE.*

Zhang Wenqi et al., Visual Analysis of Abnormal Behavior Based on Multidimensional Timing Log, Computer Engineering and Application, vol. 56(10), 2020 (English translation of abstract in the first page is submitted herewith.).

* cited by examiner

MULTIDIMENSIONAL SECURITY SITUATION REAL-TIME REPRESENTATION METHOD AND SYSTEM AND APPLICABLE TO NETWORK SECURITY

CROSS-REFERENCE TO RELATED APPLICATION AND CLAIM OF PRIORITY

This application claims the benefit under 35 USC § 119 of Chinese Patent Application No. 202210422964X, filed on Apr. 21, 2022, in the China Intellectual Property Office, the entire disclosure of which is incorporated herein by reference for all purposes.

BACKGROUND

1. Field

The present invention relates to the technical field of data processing, particularly to a multidimensional security situation real-time presentation method applicable to network security.

2. Background Art

In recent years, with increasing soaring of network attack, how to safeguard prompt response of critical information infrastructures of corporations when network security events occur, improve network security situation awareness, event analysis, traceability and rapid ability recovery after attack to effectively cope with high intelligence attack so as to provide the corporations with critical safeguard and support is the priority among priorities in critical information infrastructure protection. Particularly during major safeguard activities such as network security exercises, emergency response speed and quality decide whether a major security event can be coped with successfully and a loss is retrieved.

In recent years, network security construction is enhanced gradually, and a WEB application protection system, a vulnerability scanning system, a situation awareness platform, an IPS, a terminal access system, a log audit system, an anti-virus system, a firewall and other security application systems are deployed in an intranet. Although a network security risk control room has managed the above systems and devices in a centralized manner, in an analysis and disposal process, each device generates massive waning information (upon investigation, a large organization averagely generates 170000 warning events every week) every day. A plenty of warning information is ignored because of problems such as shortage of security event analysis personnel, low disposal efficiency and the like, thereby having underlying security problems. In addition, a security event disposal flow is not updated timely and is even seldom updated, which affects the security disposal effect. For example, with respect to security vulnerabilities of systems or applications, a platform is further monitored in real time manually, related vulnerability information is downloaded after the security vulnerabilities are found and an inspection and rectification sheet is manufactured, a notification is issued/fed back through an OA system of the intranet, and then manual retest is performed to close the loop, which results in difficulty in an inspection and rectification flow and low work efficiency. The reason is shortage of a set of AI (Artificial Intelligence) technology+SOAR (Security Orchestration, Automation and Response) technology-based network security event rapid emergency response system helping to settle vulnerability disposal, inspection and rectification and various security monitor, analysis and disposal scenarios.

Therefore, there is an urgent need of a test method for a security scenario, which is able to perform a security simulation test on a network event, thereby improving the degree of security of the network.

SUMMARY

One or more embodiments of the present invention provide a multidimensional security situation real-time presentation method applicable to network security, which is able to perform a security simulation test on a network event and record and display behaviors of staff, thereby improving the operational capacity of the operating staff and the degree of security of the network.

In a first aspect, an embodiment of the present invention provide a multidimensional security situation real-time presentation method applicable to network security, including:

selecting security testing cases of at least one dimensionality based on a test instruction to generate a target test set, and generating a corresponding target log set according to the target test set;

running each of the security testing cases in the target test set, and counting monitoring event logs produced by the network security processing system of the platform to generate a monitoring log set;

in a case where the test events in the target log set do not correspond to the monitoring event logs in the monitoring log set, determining a difference log set according to the target log set and the monitoring log set;

acquiring first processing path sets corresponding to the target log set, each of the first processing path sets having a first sub-processing path corresponding to the test event log, and determining a second processing path set according to the target log set and the monitoring log set, the second processing path set including at least one second sub-processing path;

acquiring an initial node and a cut-off node of the second sub-processing path, and monitor behaviors of a staff based on the initial node and the cut-off node to generate a corresponding monitoring processing path;

comparing each of the monitoring nodes in the monitoring processing path with each of the processing nodes in the second sub-processing path to obtain a test processing time period and an enhanced training node, and obtaining a test processing efficiency according to the test processing time period and the enhanced training node; and performing real-time output display of difference log events, test processing time periods, enhanced training nodes and the test processing efficiency corresponding to the difference log set.

Optionally, in a possible implementation mode of the first aspect, the step of selecting security testing cases of at least one dimensionality based on a test instruction to generate a target test set, and generating a corresponding target log set according to the target test set specifically includes:

pre-allocating security testing cases of various types of dimensionalities, each type of the security testing cases being used for testing corresponding network security units in a network security processing system of a platform, and each of the security testing cases having a test tag corresponding thereto;

receiving quantity selection information inputted by a user, randomly selecting a corresponding quantity of test tags according to the quantity selection information and selection weights of the test tags, and determining corresponding security testing cases based on the test tags and generating a target test set; and determining a corresponding target test log according to the test tag of each of the security testing cases in the target test set to obtain a target log set, wherein each of the target test logs has a test tag corresponding thereto.

Optionally, in a possible implementation mode of the first aspect, the step of, in a case where the test events in the target log set do not correspond to the monitoring event logs in the monitoring log set, determining a difference log set according to the target log set and the monitoring log set specifically includes:

in a case where the testing quantity of the test events in the target log set does not correspond to the monitoring quantity of the monitoring event logs in the monitoring log set.

comparing all the test tags in the target log set with all the monitoring tags in the monitoring log set, determining the test tags not corresponding to the monitoring tags as difference tags, and generating the difference log events according to the different tags; and counting all the difference log events to generate the difference log set.

Optionally, in a possible implementation mode of the first aspect, the step of acquiring an initial node and a cut-off node of the second sub-processing path, and monitoring behaviors of a staff based on the initial node and the cut-off node to generate a corresponding monitoring processing path specifically includes:

sequencing processing nodes in the second sub-processing path according to a node sequence to obtain a sequencing result, a first sub-processing node in the sequencing result being taken as the initial node and the last processing node being taken as the cut-off node;

selecting the initial node as a first type node and all nodes from a second processing node to the cut-off node as second type nodes; and performing locking processing on all the second type nodes according to a preset condition, so that all the second type nodes can be unlocked to be further triggered only after preposed nodes thereof are triggered.

Optionally, in a possible implementation mode of the first aspect, the step of comparing each of the monitoring nodes in the monitoring processing path with each of the processing nodes in the second sub-processing path to obtain a test processing time period and an enhanced training node and obtaining a test processing efficiency according to the test processing time period and the enhanced training node specifically includes:

in a case where it is judged that the staff has a behavior of triggering the initial node, collecting a moment at the time as a first time, and in a case where it is judged that the staff has a behavior of triggering the cut-off node, collecting the moment at the time as a second time; and determining a time period between the first time and the second time as the test processing time period.

Optionally, in a possible implementation mode of the first aspect, the step of comparing each of the monitoring nodes in the monitoring processing path with each of the processing nodes in the second sub-processing path to obtain a test processing time period and an enhanced training node and obtaining a test processing efficiency according to the test processing time period and the enhanced training node specifically includes:

pre-allocating effective triggering behaviors, and after the initial node is effectively triggered, monitoring all the effective triggering behaviors and generating the monitoring processing path;

sequencing all the monitoring nodes in the monitoring processing path according to a time sequence, through which the monitoring nodes are effectively triggered, to obtain a first monitoring sequencing result, where each of the monitoring nodes corresponds to one effective triggering behavior;

comparing each of the monitoring nodes in the first monitoring sequencing result with each of the processing nodes in the second sub-processing path, and dividing the first monitoring sequencing result into a plurality of monitoring sub-segments; and counting the quantity of the monitoring nodes in each of the monitoring sub-segments to obtain the quantity of fault-tolerant paragraphs of the processing nodes corresponding to the monitoring sub-segment the processing nodes with the quantity of fault-tolerant paragraphs greater than a preset quantity being taken as the enhanced training nodes.

Optionally, in a possible implementation mode of the first aspect, the step of comparing each of the monitoring nodes in the first monitoring sequencing result with each of the processing nodes in the second sub-processing path, and dividing the first monitoring sequencing result into a plurality of monitoring sub-segments specifically includes:

taking the corresponding monitoring nodes in the first monitoring sequencing result after comparing them with the processing nodes as separating nodes;

selecting any two adjacent separating nodes, the effectively triggered separating node at a previous time being taken as a first separating node and the effectively triggered separating node at a late time being taken as a second separating node; and determining the corresponding monitoring sub-segments according to the first separating node and the second separating node, where each of the monitoring sub-segments corresponds to the second separating node.

Optionally, in a possible implementation mode of the first aspect, the step of comparing each of the monitoring nodes in the monitoring processing path with each of the processing nodes in the second sub-processing path to obtain a test processing time period and an enhanced training node and obtaining a test processing efficiency according to the test processing time period and the enhanced training node specifically includes:

comparing the test processing time period with a preset standard time period to obtain a first efficiency factor;

counting the quantity of fault-tolerant paragraphs of all the monitoring sub-segments corresponding to each of the monitoring processing paths to obtain the total quantity of fault tolerance of each of the monitoring processing paths, and comparing the total quantity of fault tolerance with the processing quantity of the processing nodes in the corresponding second sub-processing path to obtain a second efficiency factor; and generating the test processing efficiency according to the first efficiency factor, the second efficiency factor and the quantity of the enhanced training nodes.

Optionally, in a possible implementation mode of the first aspect, the step of receiving quantity selection information inputted by a user, randomly selecting a corresponding quantity of test tags according to the quantity selection information and selection weights of the test tags, and determining corresponding security testing cases based on the test tags and generating a target test set specifically includes:

acquiring the monitoring tags corresponding to the monitoring processing path, and determining the selection weights of the corresponding test tags at a previous time according to the monitoring tags;

comparing the test processing efficiency generated at a current time with a preset test processing efficiency, and performing migration processing on the selection weights at the previous time to obtain updated selection weights; and randomly selecting the test tags in sequence according to e selection weights of the test tags, and determining the corresponding security testing cases based on the test tags to generate the target test set till the quantity of the test tags corresponds to the quantity selection information.

In a second aspect, an embodiment of the present invention provide a multidimensional security situation real-time presentation system applicable to network security, including:

a selection module, configured to select security testing cases of at least one dimensionality based on a test instruction to generate a target test set, and generate a corresponding target log set according to the target test set;

a running module, configured to run each of the security testing cases in the target test set, and count monitoring event logs produced by the network security processing system of the platform to generate a monitoring log set;

a determination module, configured to, in a case where the test events in the target log set do not correspond to the monitoring event logs in the monitoring log set, determine a difference log set according to the target log set and the monitoring log set;

acquire first processing path sets corresponding to the target log set, each of the first processing path sets having a first sub-processing path corresponding to the test event log, and determine a second processing path set according to the target log set and the monitoring log set, the second processing path set including at least one second sub-processing path;

a comparison module, configured to acquire an initial node and a cut-off node of the second sub-processing path, monitor behaviors of a staff based on the initial node and the cut-off node to generate a corresponding monitoring processing path, compare each of the monitoring nodes in the monitoring processing path with each of the processing nodes in the second sub-processing path to obtain a test processing time period and an enhanced training node and a test processing efficiency; and a display module, configured to perform real-time output display of difference log events, test processing time periods, enhanced training nodes and the test processing efficiency corresponding to the difference log set.

In a third aspect, an embodiment of the present invention provide a storage medium, the storage medium having a computer program stored thereon, where the computer program, when executed by a processor, is used for implementing the first aspect and the various possibly designed methods in the aspect of the present invention.

According to the multidimensional security situation real-time presentation method and system applicable to network security provided by an embodiment of the present invention, a plurality of security testing cases can be preset, and the system can be run according to the corresponding security testing cases to trigger network security events in the platform. After the network security events are triggered, detection will be first performed in dimensionality of log events to judge whether problematic omissions occur in the network security processing system of the platform to lead to a part of system vulnerabilities unfound. After the problems in the dimensionality of logs, an embodiment of the present invention will monitor the operating behavior of the staff to obtain corresponding monitoring processing paths, obtain the corresponding test processing time periods and the enhanced training nodes in combination with different quantities and times of the nodes between the monitoring processing paths and the second sub-processing path, and determine the test processing efficiency in combination with the test processing time periods and the enhanced training nodes, so that the operating and processing efficiencies of the staff and crucial nodes where operations are mistaken can be found in each type of network security during every test, thereby providing a basis for performing targeted training on staff subsequently. The ability of the staff weak in disposing a certain type of emergency events during emergency event disposal can be determined according to the test processing efficiency, so that the ability of the staff is enhanced and the staff is trained in a targeted manner.

According to the technical solution provided by one or more embodiments of the present invention, when the monitoring processing paths are obtained, the corresponding initial triggering condition and the cut-off trigging condition will be set, so that the prevent invention can record and determine the operating time of the user in an artificial intelligence manner, so as to prevent the staff from cheating during test. Furthermore, the second type nodes in an embodiment of the present invention are subjected to locking processing according to the preset condition, so that there is a sequence condition to trigger all the second type nodes, thereby further complying with the actual operation and maintenance operations. Moreover, an embodiment of the present invention will separate the first monitoring sequencing result in combination with each of the processing nodes in the second sub-processing path to obtain the plurality of sub-monitoring sub-segments and count the quantity of the monitoring nodes in each of the monitoring sub-segments to obtain the quantity of fault-tolerant paragraphs so as to count the quantity of the corresponding operation mistake behaviors of the staff when a certain node completes a correct operation in a certain maintenance and repair process. Therefore, an embodiment of the present invention can obtain the enhanced training nodes, so that when the staff is trained in a later period, the staff can be trained in a targeted manner according to the enhanced training nodes, and therefore, the professional skill of the staff is improved.

According to the technical solution provided by one more embodiments of the present invention, the final test processing efficiency will be determined according to the plurality of dimensionalities such as the test processing time period, the preset standard time period, the total quantity of fault tolerance and the processing quantity of the corresponding processing nodes, so that the test processing efficiency can evaluate the operating behaviors of the staff during maintenance more objectively and comprehensively. Moreover, an embodiment of the present invention will compare the test processing efficiency with the preset test processing efficiency to further update the selection weights of the corresponding selection tags, so that the monitoring tags with low test efficiencies are preferably selected in subsequent pick and selection of test tags. Under a circumstance that the test time and quantity are reduced, the weak maintenance behaviors of the staff are tested in a targeted manner, to realize simulation training of maintenance, so that targeted training is conducted on the staff in the later period.

DETAILED DESCRIPTION

Figure 1:
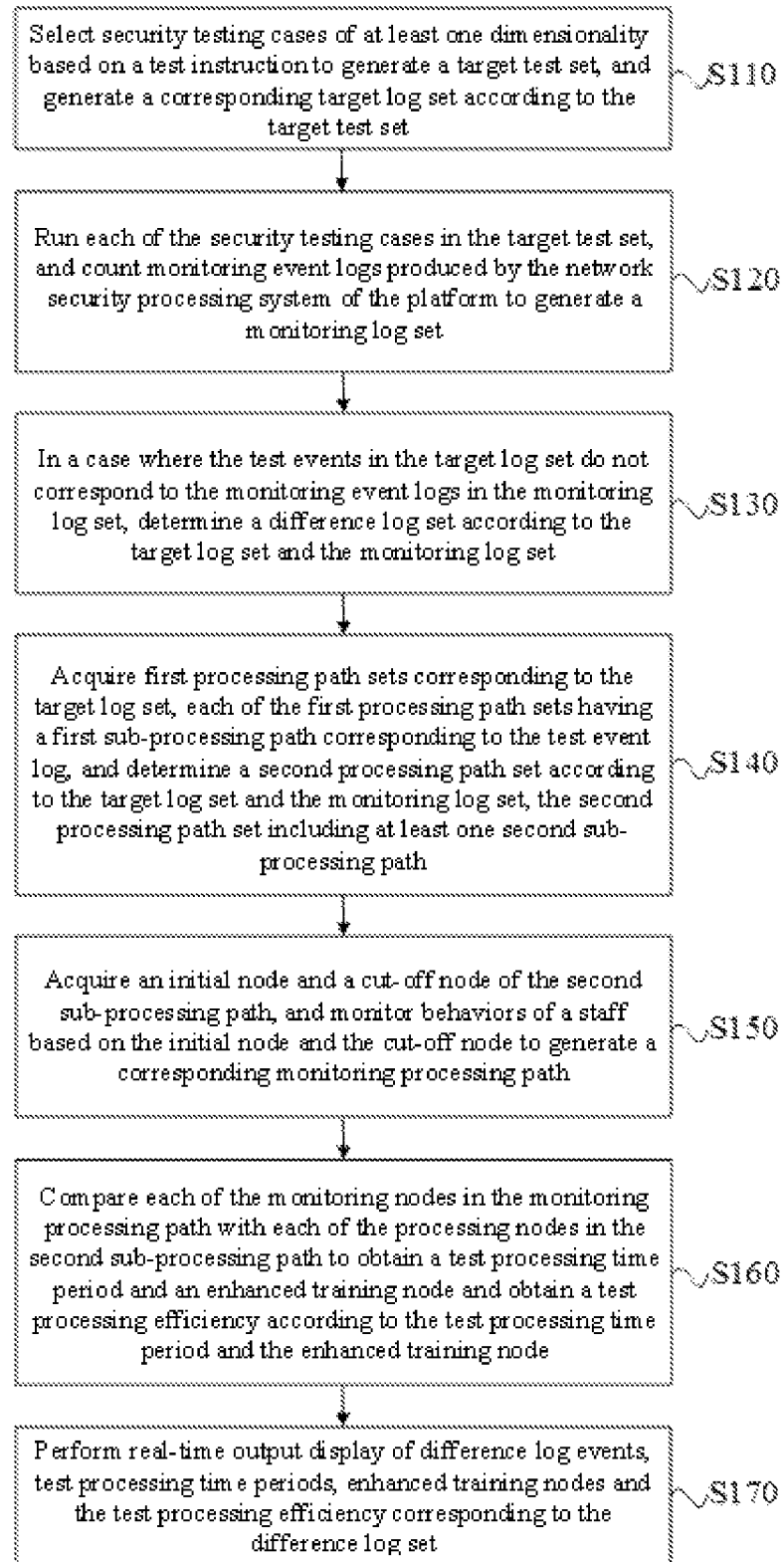
FIG. 1 is a flowchart of a first implementation mode of a multidimensional security situation real-time presentation method applicable to network security.

In order to make objectives, technical solutions and advantages of the one or more embodiments of the present invention clearer, description will be made on technical solution in the one or more embodiments of the present invention below in combination with drawings in the one or more embodiments of the present invention. It is apparent that the described embodiments are a part of embodiments of the present invention and are not all the embodiments. On a basis of the embodiments in the present invention, all other embodiments obtained by those of ordinary in the technical field without creative efforts fall into the scope of protection of the present invention.

Terms "first", "second", "third" and "fourth" and the like (if exist) in the description, the claims and the drawings are used for distinguishing similar objects and not have to describe a specific sequence or precedence order. It shall be understood that data used in this way can be interchanged, such that the embodiments of the present invention described herein can be, for example, implemented in sequences except those illustrated in graph or described herein.

It is to be understood that, in each embodiment of the present invention, a magnitude of a sequence number of each process does not mean an execution sequence and the execution sequence of each process should be determined by its function and an internal logic and should not form any limit to an implementation process of the embodiments of the present invention.

It is to be understood that in the present invention, terms "include" and "have" and any deformation thereof are intended to cover non exclusive inclusions, for example, processes, methods, systems, products or devices including a series of steps or units have not to be limited to clear listing of these steps or units but to include other steps or units that are not listed clearly and other inherent steps or units of these processes, methods, products or devices.

It is to be understood that in the present invention, "more" refers to two or more than two. Term "and/or" is only an association relationship describing associated objects and represents that three relationships may exist. For example, A and/or B may represent three conditions: i.e., independent existence of A, existence of both A and B and independent existence of B. Character "/" in the present invention usually represents that previous and next associated objects form an "or" relationship. "Including A, B and C", and "including A, B, C" refer to including A, B and C, "including A, B or C" refers to including one of A, B and C, and "including A, B and/or C" refers to including any one, two or three of A, B and C.

It is to be understood that in the present invention, "B corresponding to A", "B correspondent to A", "A corresponds to B" or "B corresponds to A" represent that B is associated with A, and B may be determined according to A. Determination of B according to A does not mean determination of B only according to A but also determination of B according to A and/or other information. Match of A and B means that the similarity between A and B is greater than or equal to a preset threshold.

Dependent on a context, for example, "if" used herein may be construed as "at the moment of" or "at the time of" or "in response to determine" or "in response to detect".

The technical solution of the present invention will be described in detail below with specific embodiments. The following specific embodiments may be combined. The same or similar concepts or processes will not be elaborated in some embodiments.

An embodiment of the present invention provides a multidimensional security situation real-time presentation method applicable to network security, as shown in FIG. 1, including:

S110: security testing cases of at least one dimensionality are selected based on a test instruction to generate a target test set, and a corresponding target log set is generated according to the target test set. An embodiment of present invention will receive the test instruction inputted by the staff through the input module, and at the time, an embodiment of the present invention will select the security testing cases of at least one dimensionality to generate the target test set. Different security testing cases will have different test directions such as a Github sensitive information leakage direction, a WEB attack event test direction, a host computer abnormal login test direction and a host computer vulnerability warning test direction. After different security testing cases trigger corresponding warning times, at the time, corresponding logs will be obtained, for example, a Github sensitive information leakage event log, a WEB attack event log, a host computer abnormal login event log and a host computer vulnerability warning event log. At the time, the corresponding target log set will be obtained.

Figure 2:
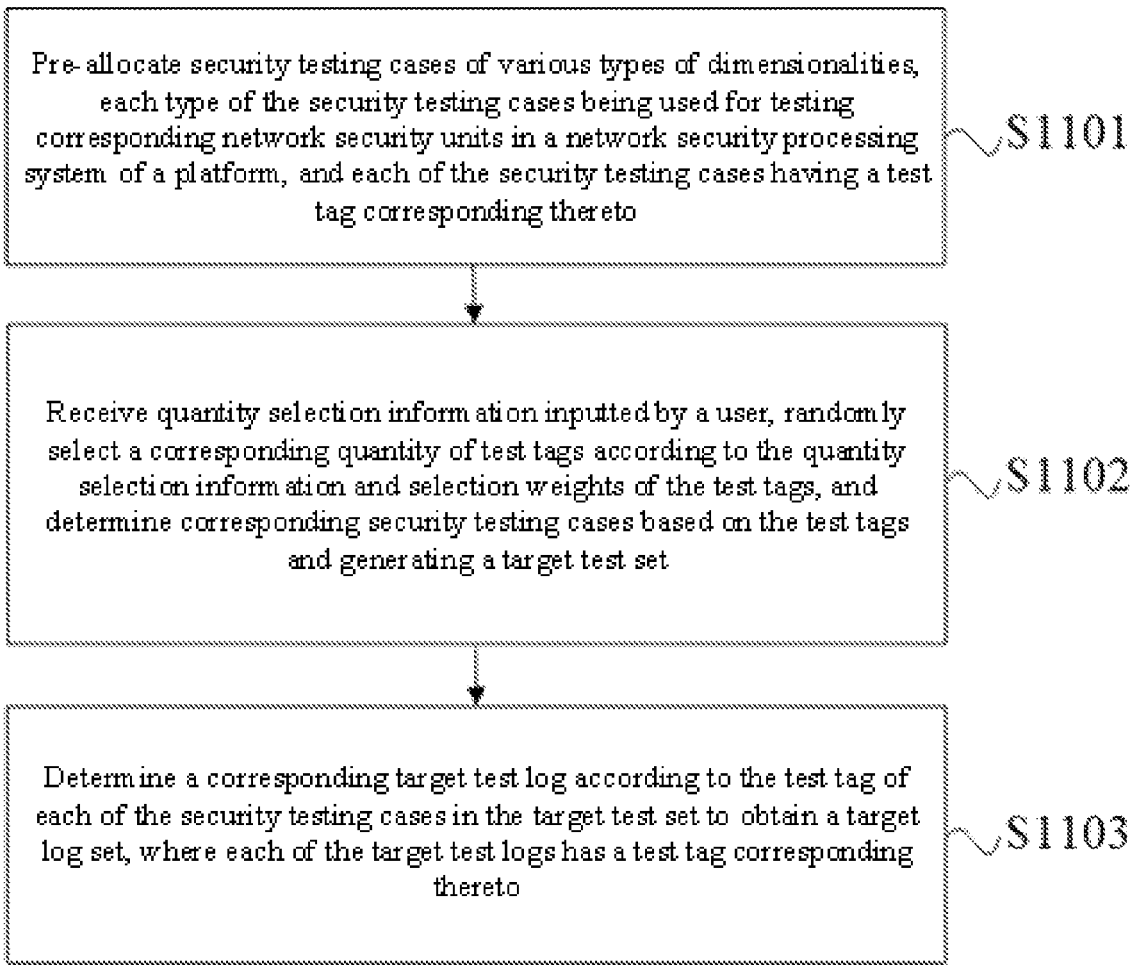
FIG. 2 is a flowchart of a second implementation mode of a multidimensional security situation real-time presentation method applicable to network security.

According to the technical solution provided by an embodiment of the present invention, in a possible implementation mode, as shown in FIG. 2, step S110 specifically includes:

Step S1101: security testing cases of various types of dimensionalities are pre-allocated, each type of the security testing cases being used for testing corresponding network security units in a network security processing system of a platform, and each of the security testing cases having a test tag corresponding thereto. An embodiment of the present invention will preset the security testing cases, and the staff may set the security testing cases according to actual test demands. The platform of an embodiment of the present invention will include a network security processing system which may be regarded as a security module such as a firewall and a system. The firewall will have different network security units such as a unit for detecting Github sensitive information leakage, a WEB attack detection and defense unit and a unit for warning host computer abnormal login. An embodiment of the present invention will configure the corresponding test tags for the security testing cases, and the test tags of the security testing cases are different.

Step S1102: quantity selection information inputted by a user is received, a corresponding quantity of test tags is randomly selected according to the quantity selection information and selection weights of the test tags, and corresponding security testing cases are determined based on the test tags and generating a target test set. An embodiment of the present invention will receive the quantity selection information imitatively inputted by the user. It can be understood that the quantity selection information is the quantity of the selected test tags. The quantity selection information is, for example, 2, 5 and the like. As the quantity of the selected test tags is great, an embodiment of the present invention will comprehensively select the corresponding quantity of test tags according to the selection weights randomly. The greater the selection weights are, the greater the probabilities that the test tags are selected are.

The probability of being selected corresponding to each of the test tags can be calculated through the following formula:

$$a_b = \frac{k_b}{\sum_{i=1}^{n} k_i}$$

where, $\alpha_b$ is the probability of being selected corresponding to the $b^{th}$ test tab, $k_b$ is the selection weight corresponding to the $b^{th}$ test tab, $k_i$ is the selection weight corresponding to the $i^{th}$ test tab, and n is an upper limit value of the test tag. The sum of weights of all test tags can be obtained through $$\sum_{i=1}^{n} k_i,$$

and the probability of being selected corresponding to each of the test tags is obtained according to the probability that each of the test tags in the sum of the weights.

100 extracted units are established, the probability of being selected corresponding to each of the test tags is multiplied with 100 to obtain the quantity of the extracted units corresponding to each of the test tags, and all extracted units of all the test tags are allocated randomly. Randomly allocated extracted units are randomly selected, and the test tags corresponding to the randomly selected extracted units are taken as the randomly selected test tags.

Step S1103: a corresponding target test log is determined according to the test tag of each of the security testing cases in the target test set to obtain a target log set, where each of the target test logs has a test tag corresponding thereto. According to an embodiment of the present invention, the target log set will be obtained according to the test tags of the security testing cases. The security testing cases will be run subsequently. In a case where the network security processing system of the platform works normally, corresponding target log sets will be generated in a one-to-one correspondence manner at the time. Therefore, according to an embodiment of the present invention, the corresponding target log sets will be obtained according to the test tags.

Step S120: each of the security testing cases in the target test set is run, and monitoring event logs produced by the network security processing system of the platform is counted to generate a monitoring log set. According to an embodiment of the present invention, after the target test set is obtained, each of the security testing cases in the target test set will be run either separately or simultaneously. In the process, according to an embodiment of the present invention, monitoring event logs produced by the network security processing system of the platform will be counted to generate the monitoring log set. It can be understood in such a manner that the monitoring log set produced by the network security processing system is the obtained security influence event.

Step S130: in a case where the test events in the target log set do not correspond to the monitoring event logs in the monitoring log set, a difference log set is determined according to the target log set and the monitoring log set. At the time, there is a situation that the security events triggered by all the security testing cases in the target test set are not monitored by the network security processing system provided by an embodiment of the present invention, the difference log set will be obtained at the time according to an embodiment of the present invention. The difference log set is the monitoring event logs which shall emerge but do not emerge in the monitoring log set. At the time, at the time, there is a missing monitoring situation for the security events triggered by running of the security testing cases in the target test set.

In a case where the test events in the target log set correspond to the monitoring events in the monitoring log set, it is proved that the security events triggered by all the security testing cases in the target test set are monitored by the network security processing system provided by an embodiment of the present invention. Therefore, at the time, it is unnecessary to generate the difference log set, and the network security processing system at the time accurately monitors the quantity of the security events.

According to the technical solution provided by an embodiment of the present invention, step S130 specifically includes:

in a case where the testing quantity of the test events in the target log set does not correspond to the monitoring quantity of the monitoring event logs in the monitoring log set, at the time, there is a missing monitoring situation for part of the security events.

All the test tags in the target log set are compared with all the monitoring tags in the monitoring log set, the test tags not corresponding to the monitoring tags are determined as difference tags, and the difference log events are generated according to the different tags. Different logs have different tags. For example, the monitoring tag corresponding to Github sensitive information leakage detection can be A001 and the test tag corresponding to Github sensitive information leakage detection can be B001, and at the time, it can be considered that A001 corresponds to B001, i.e., Arabic numerals in suffixes correspond. In a case where the monitoring log set does not have corresponding monitoring tags with respect to the test tags in the target log set, it is considered that at the time, the corresponding test tags in the target log set are difference tags, and at the time, corresponding difference log events will be obtained.

It can be understood in such a manner that when the security testing cases are generated, corresponding tags are allocated to the security testing cases, for example, C001. At the time, there are suffixes of 001 when the corresponding target event logs and the monitoring event logs are subsequently obtained, which is liable to count the difference log events.

For example, the security testing cases corresponding to WEB attack detection are C002, and the test tags have A002 but the monitoring tags do not have B002. At the time, the obtained difference log events can be D002.

All the difference log events are counted to generate the difference log set. An embodiment of the present invention will count all the difference log events to generate the difference log set.

Step S140: first processing path sets corresponding to the target log set are acquired, each of the first processing path sets having a first sub-processing path corresponding to the test event log, and determine a second processing path set according to the target log set and the monitoring log set, the second processing path set including at least one second sub-processing path.

After the target log set is obtained, the first processing path set corresponding to the target log set will be obtained, and at the time, the first sub-processing path can be regarded as being preset. For example, when Github sensitive information leakage emerges, the corresponding first sub-processing path is the operating path for solving the Github sensitive information leakage at the time. The operating path is for example, as follows: staff logs in with an administrator identity→selects a terminal with Github sensitive information leakage→deletes corresponding part in the terminal with Github sensitive information leakage.

An embodiment of the present invention will determine the second processing path set according to the target log set and the monitoring log set. Since in a case where the target log set does not correspond to the monitoring log set, it is proved that at the time, missing monitoring event logs have emerged, and at the time, staff has not found the security events corresponding to the missing monitoring event logs, so that in order to reduce the subsequent calculating quantity at the time, screening will be performed based on the first processing path set to obtain the second processing path set corresponding to the monitoring log set. It can be understood in such a manner that all the second sub-processing paths in the second processing path set will be compared to judge whether the operating behaviors of the user are accurate and compliant.

Step S150: an initial node and a cut-off node of the second sub-processing path are acquired, and behaviors of a staff based on the initial node and the cut-off node are monitored to generate a corresponding monitoring processing path. The second sub-processing path is as follows: the staff logs in with an administrator identity→selects the terminal with Github sensitive information leakage→deletes corresponding part in the terminal with Github sensitive information leakage. At the time, the initial node is that the staff logs in with an administrator identity and the cut-off node is that the staff deletes corresponding part in the terminal with Github sensitive information leakage. At the time, all the operating behaviors of the user will be monitored to obtain corresponding monitoring processing paths. For example, in an actual operating process of the user, either a mistaken selecting behavior may appear in selecting the terminal with the Github sensitive information leakage or a behavior of deleting other insensitive information contents in the terminal with the Github sensitive information leakage may appear. At the time, an embodiment of the present invention will monitor all the above-mentioned behaviors to obtain the corresponding monitoring processing paths.

The embodiment of the present invention will judge the time point to start monitoring of the behaviors of the staff and the time point to finish monitoring of the behaviors of the staff according to the initial node and the cut-off node and generate the monitoring processing path according to all behaviors of the staff from the time point to start monitoring of the behaviors of the staff and the time point to finish monitoring of the behaviors of the staff.

According to the technical solution provided by an embodiment of the present invention, in a possible implementation mode, step S150 specifically includes:

processing nodes in the second sub-processing path are sequenced according to a node sequence to obtain a sequencing result, a first sub-processing node in the sequencing result being taken as the initial node and the last processing node being taken as the cut-off node. The staff logs in with an administrator identity considered to the first processing node, selects the terminal with Github sensitive information leakage considered to the second processing node, and deletes corresponding part in the terminal with Github sensitive information leakage considered to the third processing node.

The initial node is selected as a first type node and all nodes from a second processing node to the cut-off node are selected as second type nodes. At the time, an embodiment of the present invention will classify the nodes according to different positions of the nodes, and different types of nodes will have different processing attributes.

Locking processing is performed on all the second type nodes according to a preset condition, so that all the second type nodes can be unlocked to be further triggered only after proposed nodes thereof are triggered. In order to guarantee that operations of the staff in the test process comply with regulations and flows and prevent cheating and the like, an embodiment of the present invention will set an unlocking condition for each of the second type nodes. The unlocking condition can be understood that it is the condition set by a preset condition locking processing which is as follows: the corresponding second type nodes can be unlocked to be further triggered only when the proposed node of each of the second type nodes is triggered. In the above manner, the staff performing maintenance operation has corresponding operating flows and sequences.

Step S160: each of the monitoring nodes in the monitoring processing path is compared with each of the processing nodes in the second sub-processing path to obtain a test processing time period and an enhanced training node and obtain a test processing efficiency according to the test processing time period and the enhanced training node. According to the technical solution provided by an embodiment of the present invention, corresponding processing time periods and enhanced training nodes will be obtained according to the monitoring nodes and the processing nodes. The longer the processing time periods are, the higher the maintenance difficulty of the corresponding security events may be. The less skilled the staff in operation is, the more the enhanced training nodes are, which proves that the less skilled the operator in the operating behavior and processing behavior at a certain operating node is, the more the targeted training be enhanced. An embodiment of the present invention will determine the final test processing efficiency in combination with the processing time periods and the enhanced training nodes so as to judge the integral operating condition of the staff.

According to the technical solution provided by an embodiment of the present invention, in a possible implementation mode, step S160 specifically includes:

in a case where it is judged that the staff has a behavior of triggering the initial node, a moment at the time is collected as a first time, and in a case where it is judged that the staff has a behavior of triggering the cut-off node, the moment at the time is collected as a second time. In a case where the staff has operations and behaviors to trigger the initial node, it is proved that at the time, the staff has started to maintain the security events, it is necessary to determine the moment at the time and take the moment at the time as the first time. In a case where the staff has operations and behaviors to trigger the cut-off node, it is proved that at the time, the staff has completed maintenance of the security events, it is necessary to determine the moment at the time and take the moment at the time as the second time.

A time period between the first time and the second time is determined as the test processing time period. The longer the test processing time period is, the more complicated the corresponding security event is, or the less skilled the staff in operation is.

According to the technical solution provided by an embodiment of the present invention, in a possible implementation mode, step S160 specifically includes:

effective triggering behaviors are pre-allocated, and after the initial node is effectively triggered, all the effective triggering behaviors are monitored and the monitoring processing path is generated. An effective triggering behavior can be as follows: the staff selects all modules and clickable options in the whole platform in a manner of double clicking to select positions such as corresponding icons and input box by mouse. The initial node is effectively triggered, which can be understood that the staff logs in with the administrator identity and double clicks corresponding options such as "confirm" and "log in". Different UI interfaces have different forms for options, icons and input boxes. In a case where the staff completes double clock every time, it can be considered that the staff completes an option and effective triggering. After the initial node is triggered, all the effective triggering behaviors are monitored to generate the monitoring processing path. After the initial node is effectively triggered, all the effective triggering behaviors are monitored to generate the monitoring processing path. For example, the staff double clicks "My computer", which will also be monitored, and belongs to a part of the monitoring processing path.

All the monitoring nodes in the monitoring processing path are sequenced according to a time sequence, through which the monitoring nodes are effectively triggered, to obtain a first monitoring sequencing result, where each of the monitoring nodes corresponds to one effective triggering behavior. After the monitoring processing is obtained, an embodiment of the present invention will sequence the monitoring nodes according to a time sequence so as to obtain an operating path of the staff with the time sequence.

Each of the monitoring nodes in the first monitoring sequencing result is compared with each of the processing nodes in the second sub-processing path, and the first monitoring sequencing result is divided into a plurality of monitoring sub-segments. For example, the first monitoring sequencing result is as follows: the staff logs in with an administrator identity→selects my computer→escapes my computer→selects a terminal with Github sensitive information leakage→deletes corresponding part in the terminal with Github sensitive information leakage. At the time, an embodiment of the present invention will divide the first monitoring sequencing result into the plurality of monitoring sub-segments, The first monitoring sub-segment is as follows: the staff logs in with an administrator identity→selects my computer→escapes my computer→selects the terminal with Github sensitive information leakage; the second monitoring sub-segment is as follows: the staff selects terminal with Github sensitive information leakage→deletes corresponding part in the terminal with Github sensitive information leakage.

The quantity of the monitoring nodes in each of the monitoring sub-segments are counted to obtain the quantity of fault-tolerant paragraphs of the processing nodes corresponding to the monitoring sub-segment the processing nodes with the quantity of fault-tolerant paragraphs greater than a preset quantity being taken as the enhanced training nodes. There are two mistake monitoring nodes in the first monitoring sub-segment, that is, "select my computer" and "escape my computer", which can be considered that the quantity of the fault-tolerant paragraphs in the first monitoring sub-segment is 2, for example, the preset quantity is 1. At the time, the node corresponding to the terminal with Github sensitive information leakage is selected as the enhanced training node. That is, the staff needs to perform enhanced training on terminal selection.

According to the technical solution provided by an embodiment of the present invention, in a possible implementation mode, the step of comparing each of the monitoring nodes in the first monitoring sequencing result with each of the processing nodes in the second sub-processing path, and dividing the first monitoring sequencing result into a plurality of monitoring sub-segments specifically includes:

the corresponding monitoring nodes in the first monitoring sequencing result after comparing them with the processing nodes are taken as separating nodes. An embodiment of the present invention will take the monitoring nodes corresponding to the processing nodes as the separating nodes, and at the time, the separating nodes are respectively as follows: the staff logs in with an administrator identity-→selects a terminal with Github sensitive information leakage→deletes corresponding part in the terminal with Github sensitive information leakage.

Any two adjacent separating nodes are selected, the effectively triggered separating node at a previous time being taken as a first separating node and the effectively triggered separating node at a late time being taken as a second separating node. For example, two adjacent separating nodes are selected as follows: the staff logs in with an administrator identity and selects the terminal with Github sensitive information leakage. The first separating node at the time is as follows: the staff logs in with an administrator identity. The second separating node is as follows: the staff selects the terminal with Github sensitive information leakage.

The corresponding monitoring sub-segments are determined according to the first separating node and the second separating node, where each of the monitoring sub-segments corresponds to the second separating node. At the time, the monitoring sub-segment determined according to the first separating node and the second separating node is as follows: the staff logs in with an administrator identity→selects my computer→escapes my computer→selects the terminal with Github sensitive information leakage; and the field corresponds to the node of selecting the terminal with Github sensitive information leakage, which can be considered that the staff has a mistaken operation in operation of selects the terminal with Github sensitive information leakage.

According to the technical solution provided by an embodiment of the present invention, in a possible implementation mode, step S160 specifically includes:

the test processing time period is compared with a preset standard time period to obtain a first efficiency factor. In an actual security testing scenario, different security event processing behaviors need different times, so that directly comparison of two different security event test processing time periods cannot describe the degree of proficiency of the station corresponding security event processing objectively. Therefore, an embodiment of the present invention will set corresponding preset standard time periods for each of the security events and the corresponding security testing cases. The present invention will compare the test processing time period with the preset standard time period to obtain the first efficiency factor. The greater the first efficiency factor is, the less skilled the operation of the user in processing the corresponding security events is at the time.

The quantity of fault-tolerant paragraphs of all the monitoring sub-segments corresponding to each of the monitoring processing paths are counted to obtain the total quantity of fault tolerance of each of the monitoring processing paths, and the total quantity of fault tolerance is compared with the processing quantity of the processing nodes in the corresponding second sub-processing path to obtain a second efficiency factor. Similarly, in an actual security testing scenario, different security event processing behaviors need different quantities of nodes, so that directly comparison of total quantities of fault tolerance of two different security event test processing time periods cannot describe the degree of proficiency of the staff on corresponding security event processing objectively. Therefore, an embodiment of the present invention will calculate the second efficiency factor according to each of the security events and the processing quantity of the processing nodes in the corresponding second sub-processing paths corresponding to the security testing cases. The greater the second efficiency factor is, the less skilled the operation of the user in processing the corresponding security events is at the time and the more the operating mistakes are.

The test processing efficiency is generated according to the first efficiency factor, the second efficiency factor and the quantity of the enhanced training nodes. The embodiment of the present invention will generate the final test processing efficiency according to the first efficiency factor, the second efficiency factor and the quantity of the enhanced training nodes.

The test processing efficiency can be calculated via the following formula, including:

$$f = \frac{u}{\frac{t_1}{t_2} \cdot g_1 + \frac{l_1}{l_2 + r} \cdot g_2 + v_3 \cdot g_3}$$

where $f$ is the test processing efficiency, $t_1$ is the test processing time period, $t_2$ is the preset standard time period, $g_1$ is a time processing weight value, $l_1$ is the quantity of fault-tolerant paragraphs of all the monitoring sub-segments, $l_2$ is the processing quantity of the processing nodes in the second sub-processing path, $r$ is a constant value of node quantity, $g_2$ is a weight value of the node quantity, $v_3$ is the quantity of the enhanced training node, $g_3$ is a weight value of the enhanced training node, and $u$ is a standard efficiency value.

According to the technical solution provided by an embodiment of the present invention, the standard efficiency value can be preset, the first efficiency factor can be obtained through $$\frac{t_1}{t_2} \cdot g_1,$$

the second efficiency factor can be obtained through $$\frac{l_1}{l_2 + r} \cdot g_2,$$

and an embodiment of the present invention obtains the final test processing efficiency in combination with the quantity $v_3$ of the enhanced training nodes. The greater and the more the first efficiency factor $$\frac{t_1}{t_2} \cdot g_1,$$

the second efficiency factor $$\frac{l_1}{l_2 + r} \cdot g_2$$

and the quantity $v_3$ of the enhanced training nodes are, the smaller the test processing efficiency $f$ is. The coping capacity of the staff to the corresponding security events can be reflected through the test processing efficiency, and is correspondingly improved.

In a case where the test processing efficiency is lower than the lowest processing efficiency, initiative warning prompt is performed at the time, which proves that the staff cannot dispose the corresponding security events effectively, and targeted and enhanced training, operation and excises are needed.

Step S170: real-time output display of difference log events, test processing time periods, enhanced training nodes and the test processing efficiency corresponding to the difference log set are performed. In the above-mentioned manner, supervisors in higher dimensionality can master the operating ability of the operation and maintenance staff in real time.

According to the technical solution provided by an embodiment of the present invention, in a possible implementation mode, the step of receiving quantity selection information inputted by a user, randomly selecting a corresponding quantity of test tags according to the quantity selection information and selection weights of the test tags, and determining corresponding security testing cases based on the test tags and generating a target test set specifically includes:

the monitoring tags corresponding to the monitoring processing path are acquired, and the selection weights of the corresponding test tags at a previous time are determined according to the monitoring tags. An embodiment of the present invention will determine the corresponding selection weights after obtaining the monitoring processing path every time. The initial selection weight of each of the monitoring processing paths can be preset.

The test processing efficiency generated at a current time is compared with a preset test processing efficiency, and migration processing is performed on the selection weights at the previous time to obtain updated. An embodiment of the present invention will compare the test processing efficiency generated at a current time with a preset test processing efficiency, so as to achieve an objective of updating the selection weights.

In a case where the test processing efficiency generated at the current time is greater than the preset test processing efficiency, it is proved that the user better processes the security events corresponding to the corresponding security testing cases, so that lowering processing can be performed on the selection weights at the time, that is, the probability of selecting the test tag is reduced when the test tag is determined next time.

The lowered selection weight is calculated by the following formula, $$k_\varphi = k_\omega - \frac{M_2 - M_1}{M_1} \cdot \pi_1,$$

where $k_\varphi$ is the lowered selection weight, $k_\omega$ is selection weight before lowering processing, $M_2$ is the test processing efficiency generated at the current time, $M_1$ is the preset test processing efficiency, and $\pi_1$ is the lowered weight.

The lowered amplitude of the selection weight can be obtained through $$\frac{M_2 - M_1}{M_1} \cdot \pi_1.$$

The greater the $$\frac{M_2 - M_1}{M_1}$$

is, the smaller the lowered selection weight $k_\varphi$ is. In this way, the selection weight determined in an embodiment of the present invention and the mastering degree of the staff are changed linearly, so that an embodiment of the present invention better has a test effect in randomly selecting the security testing cases.

In a case where the test processing efficiency generated at the current time is smaller than the preset test processing efficiency, it is proved that the user processes the security events poorly corresponding to the corresponding security testing cases, so that heightening processing can be performed on the selection weights at the time, that is, the probability of selecting the test tag is heightened when the test tag is determined next time.

The heightened selection weight is calculated by the following formula, $$k_\varphi = k_\omega + \frac{M_1 - M_2}{M_1} \cdot \pi_2,$$

where $\pi_2$ is a heightened weight.

The heightened amplitude of the selection weight can be obtained through $$\frac{M_1 - M_2}{M_1} \cdot \pi_2.$$

The greater the $$\frac{M_1 - M_2}{M_1}$$

is, the smaller the heightened selection weight $k_\varphi$ is. In this way, the selection weight determined in an embodiment of the present invention and the mastering degree of the staff are changed linearly, so that an embodiment of the present invention better has a test effect in randomly selecting the security testing cases.

randomly selecting the test tags in sequence according to the selection weights of the test tags, and determining the corresponding security testing cases based on the test tags to generate the target test set till the quantity of the test tags corresponds to the quantity selection information.

Figure 3:
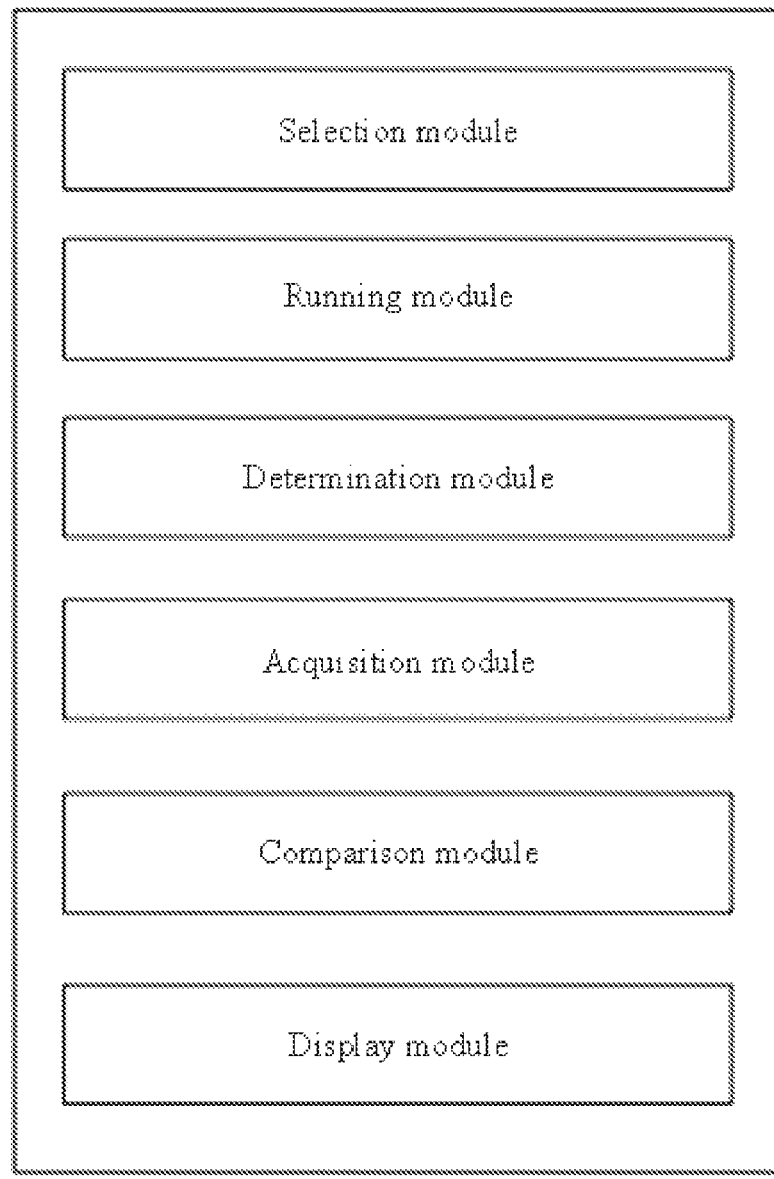
FIG. 3 is a structural diagram of a first implementation mode of a multidimensional security situation real-time presentation system applicable to network security.

In order to achieve the multidimensional security situation real-time presentation method applicable to network security provided by an embodiment of the present invention, an embodiment of the present invention further provides a multidimensional security situation real-time presentation system applicable to network security, as shown in FIG. 3, including:

a selection module, configured to select security testing cases of at least one dimensionality based on a test instruction to generate a target test set, and generate a corresponding target log set according to the target test set;

a running module, configured to run each of the security testing cases in the target test set, and count monitoring event logs produced by the network security processing system of the platform to generate a monitoring log set;

a determination module, configured to, in a case where the test events in the target log set do not correspond to the monitoring event logs in the monitoring log set, determine a difference log set according to the target log set and the monitoring log set;

an acquisition module, configured to acquire first processing path sets corresponding to the target log set, each of the first processing path sets having a first sub-processing path corresponding to the test event log, and determine a second processing path set according to the target log set and the monitoring log set, the second processing path set including at least one second sub-processing path;

a comparison module, configured to acquire an initial node and a cut-off node of the second sub-processing path, monitor behaviors of a staff based on the initial node and the cut-off node to generate a corresponding monitoring processing path, compare each of the monitoring nodes in the monitoring processing path with each of the processing nodes in the second sub-processing path to obtain a test processing time period and an enhanced training node and a test processing efficiency; and a display module, configured to perform real-time output display of difference log events, test processing time periods, enhanced training nodes and the test processing efficiency corresponding to the difference log set.

An embodiment of the present invention further provides a storage medium, the storage medium having a computer program stored thereon, where the computer program, when executed by a processor, is used for implementing the methods provided by the above-mentioned various implementation modes.

The storage medium may be either computer storage medium or a communication medium. The communication medium includes any medium convenient to transfer the computer program from one place to another place. The computer storage medium may be any usable medium that may be accessed by a universal or dedicated computer. For example, the storage medium is coupled to the processor, so that the processor may read information from the storage medium or write information into the storage medium. Of course, the storage medium may further be a component of the processor. The processor and the storage medium may be located in Application Specific Integrated Circuits (ASIC). In addition, the AISC may be located in the user equipment. Of course, the processor and the storage medium may exist in the communication device as discrete components. The storage medium may be a read-only memory (ROM), a Random Access Memory (RAM), a CD-ROM, a magnetic tape, a floppy disk, an optical data storage device and the like.

An embodiment of the present invention further provides a program product. The program product includes an execution instruction. The execution instruction is stored in the storage medium. At least one processor of the device may read the execution instruction from the storage medium, and executes the execution instruction, so that the device implements the methods provided by the above-mentioned various implementation modes.

In the embodiments of the above-mentioned terminal or server, it is to be understood that the processor may be a Central Processing Unit (CPU), and other universal processor, a Digital Signal Processor (DSP), an Application Specific Integrated Circuit (ASIC) and the like. The universal processor may be a microprocessor or the processor may also be any conventional processor and the like. The steps of the method disclosed in combination with the present invention may be directly embodied to be executed and completed by a hardware processor or executed and completed by a combination of hardware and software modules in the processor.

Finally, it shall be noted that the above embodiments are only used to explain the technical solution of the present invention and shall not be construed as limitation. Despite reference to the aforementioned embodiments to make a detailed description for the present invention, it will be understood by those of ordinary skill in the art that they still can modify the technical solution recorded by the aforementioned embodiments or make equivalent substitutions on part of technical features therein. Such modifications or substitutions do not deviate the nature of the technical scheme from the spirit and scope of the technical solution embodied in the embodiments according to the present invention.

What is claimed is:

1. A multidimensional security situation real-time presentation method applicable to network security, the method comprising:
   selecting security testing cases of at least one dimensionality based on a test instruction to generate a target test set, and generating a corresponding target log set according to the target test set;
   pre-allocating security testing cases of various types of dimensionalities, each type of the security testing cases being used for testing corresponding network security units in a network security processing system of a platform, and each of the security testing cases to having a test tag corresponding thereto;
   receiving quantity selection information inputted by a user, randomly selecting a corresponding quantity of test tags according to the quantity selection information and selection weights of the test tags, and determining corresponding security testing cases based on the test tags and generating a target test set;
   determining a corresponding target test log according to the test tag of each of the security testing cases in the target test set to obtain a target log set, wherein each of the target test logs has a test tag corresponding thereto;
   running each of the security testing cases in the target test set, and counting monitoring event logs produced by the network security processing system of the platform to generate a monitoring log set;
   in a case where the test events in the target log set do not correspond to the monitoring event logs in the monitoring log set, determining a difference log set according to the target log set and the monitoring log set;
   acquiring first processing path sets corresponding to the target log set, each of the first processing path sets having a first sub-processing path corresponding to the test event log, determining a second processing path set according to the target log set and the monitoring log set, and performing screening based on the first processing path sets to obtain the second processing path set corresponding to the monitoring log set, the second processing path set comprising at least one second sub-processing path;
   acquiring an initial node and a cut-off node of the second sub-processing path, and monitoring behaviors of a stall based on the initial node and the cut-off node to generate a corresponding monitoring processing path;
   sequencing processing nodes in the second sub-processing path according to a node sequence to obtain a sequencing result, a first sub-processing node in the sequencing result being taken as the initial node and the last processing node being taken as the cut-off node;
   selecting the initial node as a first type node and all nodes from a second processing node to the cut-off node as second type nodes;
   performing locking processing on all the second type nodes according to a preset condition, so that all the second type nodes can be unlocked to be further triggered only after preposed nodes thereof are triggered;
   comparing each of the monitoring nodes in the monitoring processing path with each of the processing nodes in the second sub-processing path to obtain a test processing time period and an enhanced training node, and obtaining a test processing efficiency according to the test processing time period and the enhanced training node;
   in a case where it is judged that the staff has a behavior of triggering the initial node, collecting a moment at the time as a first time, and in a case where it is judged that the staff has a behavior of triggering the cut-off node, collecting the moment at the time as a second time;
   determining a time period between the first time and the second time as the test processing time period;
   pre-allocating, effective triggering behaviors, and after the initial node is effectively triggered, monitoring all the effective triggering behaviors and generating the monitoring processing path;
   sequencing all the monitoring nodes in the monitoring processing path according to a time sequence, through which the monitoring nodes are effectively triggered, to obtain a first monitoring sequencing result, wherein each of the monitoring nodes corresponds to one effective triggering behavior;
   comparing each of the monitoring nodes in the first monitoring sequencing result with each of the processing nodes in the second sub-processing path, and dividing the first monitoring sequencing result into a plurality of monitoring sub-segments; and
   counting the quantity of the monitoring nodes in each of the monitoring sub-segments to obtain the quantity of fault-tolerant paragraphs of the processing nodes corresponding to the monitoring sub-segment, the processing nodes with the quantity of fault-tolerant paragraphs greater than a preset quantity being taken as the enhanced training nodes; and performing real-time output display of difference log events, test processing time periods, enhanced training nodes and the test processing efficiency corresponding to the difference log set.

2. The multidimensional security situation real-time presentation method applicable to network security according to claim 1, wherein the step of, in a case where the test events in the target log set do not correspond to the monitoring event logs in the monitoring log set, determining a difference log set according to the target log set and the monitoring log set specifically comprises:

in a case where the testing quantity of the test events in the target log set does not correspond to the monitoring quantity of the monitoring event logs in the monitoring log set, comparing all the test tags in the target log set with all the monitoring tags in the monitoring log set, determining the test tags not corresponding to the monitoring tags as difference tags, and generating the difference log events according to the different tags; and counting all the difference log events to generate the difference log set.

3. The multidimensional security situation real-time presentation method applicable to network security according to claim 1, wherein the step of comparing each of the monitoring nodes in the first monitoring sequencing result with each of the processing nodes in the second sub-processing path, and dividing the first monitoring sequencing result into a plurality of monitoring sub-segments specifically comprises:

taking the corresponding monitoring nodes in the first monitoring sequencing result after comparing them with the processing nodes as separating nodes;

selecting any two adjacent separating nodes, the effectively triggered separating node at a previous time being taken as a first separating node and the effectively triggered separating node at a late time being taken as a second separating node; and determining the corresponding monitoring sub-segments according to the first separating node and the second separating node.

4. The multidimensional security situation real-time presentation method applicable to network security according to claim 1, wherein the step of comparing each of the monitoring nodes in the monitoring processing path with each of the processing nodes in the second sub-processing path to obtain a test processing time period and an enhanced training node and obtaining a test processing efficiency according to the test processing time period and the enhanced training node specifically comprises:

comparing the test processing time period with a preset standard time period to obtain a first efficiency factor;

counting the quantity of fault-tolerant paragraphs of all the monitoring sub-segments corresponding to each of the monitoring processing paths to obtain the total quantity of fault tolerance of each of the monitoring processing paths, and comparing the total quantity of fault tolerance with the processing quantity of the processing nodes in the corresponding second sub-processing path to obtain a second efficiency factor; and generating the test processing efficiency according to the first efficiency factor, the second efficiency factor and the quantity of the enhanced training nodes.

5. The multidimensional security situation real-time presentation method applicable to network security according to claim 4, wherein the step of receiving quantity selection information inputted by a user, randomly selecting a corresponding quantity of test tags according to the quantity selection information and selection weights of the test tags, and determining corresponding security testing cases based on the test tags and generating a target test set specifically comprises:

acquiring the monitoring tags corresponding to the monitoring processing path, and determining the selection weights of the corresponding test tags at a previous time according to the monitoring tags;

comparing the test processing efficiency generated at a current time with a preset test processing efficiency, and performing migration processing on the selection weights at the previous time to obtain updated selection weights; and randomly selecting the test tags in sequence according to the selection weights of the test tags, and determining the corresponding security testing cases based on the test tags to generate the target test set till the quantity of the test tags corresponds to the quantity selection information.

6. A multidimensional security situation real-time presentation system applicable to network security, comprising:

a selection module, configured to select security testing cases of at least one dimensionality based on a test instruction to generate a target test set, and generate a corresponding target log set according to the target test set;

pre-allocate security testing cases of various types of dimensionalities, each type of the security testing cases being used for testing corresponding network security units in a network security processing system of a platform, and each of the security testing cases having a test tag corresponding thereto;

receive quantity selection information inputted by a user, randomly select a corresponding quantity of test tags according to the quantity selection information and selection weights of the test tags, and determine corresponding security testing cases based on the test tags and generating a target test set; and determine a corresponding target test log according to the test tag of each of the security testing cases in the target test set to obtain a target log set, wherein each of the target test logs has a test tag corresponding thereto;

a running module, configured to run each of the security testing cases in the target test set, and count monitoring event logs produced by the network security processing system of the platform to generate a monitoring log set;

a determination module, configured to, in a case where the test events in the target log set do not correspond to the monitoring event logs in the monitoring log set, determine a difference log set according to the target log set and the monitoring log set;

an acquisition module, configured to acquire first processing path sets corresponding to the target log set, each of the first processing path sets having a first sub-processing path corresponding to the test event log, determine a second processing path set according to the target log set and the monitoring log set, and perform screening based on the first processing path sets to obtain the second processing path set corresponding to the monitoring log set, the second processing path set comprising at least one second sub-processing path;

acquire an initial node and a cut-off node of the second sub-processing path, and monitor behaviors of a staff based on the initial node and the cut-off node to generate a corresponding monitoring processing path;

sequence processing nodes in the second sub-processing path according to a node sequence to obtain a sequencing result, a first sub-processing node in the sequencing result being taken as the initial node and the last processing node being taken as the cut-off node;

select the initial node as a first type node and all nodes from a second processing node to the cut-off node as second type nodes; and perform locking processing on all the second type nodes according to a preset condition, so that all the second type nodes can be unlocked to be further triggered only after preposed nodes thereof are triggered;

a comparison module; configured to acquire an initial node and a cut-off node of the second sub-processing path, monitor behaviors of a staff based on the initial node and the cut-off node to generate a corresponding monitoring processing path, compare each of the monitoring nodes in the monitoring processing path with each of the processing nodes in the second sub-processing path to obtain a test processing time period and an enhanced training node and a test processing efficiency;

in a case where it is judged that the staff has a behavior of triggering the initial node, collect a moment at the time as a first time, and in a case where it is judged that the staff has a behavior of triggering the cut-off node, collect the moment at the time as a second time;

determine a time period between the first time and the second time as the test processing time period;

pre-allocate effective triggering behaviors, and after the initial node is effectively triggered, monitor all the effective triggering behaviors and generate the monitoring processing path;

sequence all the monitoring nodes in the monitoring processing path according to a time sequence, through which the monitoring nodes are effectively triggered, to obtain a first monitoring sequencing result, wherein each of the monitoring nodes corresponds to one effective triggering behavior;

compare each of the monitoring nodes in the first monitoring sequencing result with each of the processing nodes in the second sub-processing path, and divide the first monitoring sequencing result into a plurality of monitoring; sub-segments; and count the quantity of the monitoring nodes in each of the monitoring sub-segments to obtain the quantity of fault-tolerant paragraphs of the processing nodes corresponding to the monitoring sub-segment, the processing nodes with the quantity of fault-tolerant paragraphs greater than a preset quantity being taken as the enhanced training nodes; and a display module, configured to perform real-time output display of difference log events, test processing time periods, enhanced training nodes and the test processing efficiency corresponding to the difference log set.

\* \* \* \* \*